United States Patent [19]

Sunaga et al.

[11] Patent Number: 5,076,004

[45] Date of Patent: Dec. 31, 1991

[54] FISHING ROD AND PRODUCTION METHOD THEREOF

[75] Inventors: Shunji Sunaga; Hiroyasu Suzue; Eiji Sugaya; Toshiaki Esashika, all of Tokyo, Japan

[73] Assignee: Daiwa Seiko, Inc., Tokyo, Japan

[21] Appl. No.: 418,578

[22] Filed: Oct. 10, 1989

[30] Foreign Application Priority Data

Nov. 2, 1988 [JP] Japan ................................ 63-278966

[51] Int. Cl.$^5$ ............................................. A01K 87/00
[52] U.S. Cl. .......................................... 43/18.1; 43/18.5
[58] Field of Search ................................. 43/18.1, 18.5

[56] References Cited

U.S. PATENT DOCUMENTS 3,953,637  4/1976  Phillips ................................ 43/18.5
4,582,758  4/1986  Bruce ................................. 43/18.1

Primary Examiner—Kurt Rowan
Attorney, Agent, or Firm—Kalish & Gilster

[57] ABSTRACT

The present invention relates to a fishing rod having a rod tube formed from synthetic resin-impregnated high strength fiber and to a production method thereof. The rod tube of the present fishing rod is filled with resin containing microglobules in a dispersed state. This makes a lighter and stronger fishing rod which withstands extreme deflection. The production method according to the present invention can adjust the ratio of the filled resin and the dispersed microglobules at the tip and butt portions of the rod. Accordingly, the weight, strength, and condition for each portion of the rod can be controlled as required.

4 Claims, 2 Drawing Sheets

FISHING ROD AND PRODUCTION METHOD THEREOF

BACKGROUND OF THE INVENTION

1. Field of the Invention

This invention relates to a fishing rod having a rod tube formed from synthetic resin-impregnated high strength fiber and to a production method thereof.

2. Description of the Prior Art

Conventional fishing rods called glass rods or carbon rods have been manufactured by producing woven sheets of high strength fiber such as glass fiber or carbon fiber, impregnating those sheets with thermosetting resin to produce prepreg sheets, wrapping the prepreg sheets around a rod tube forming mandrel to a desired thickness, and subjecting the wrapped sheets to several additional processes: a taping process, a baking process, a drawing process, and a surface finish process.

Those rods, which are lighter and stronger and offer a higher resiliency than cane rods, are now employed by many fishermen. Recently, however, still lighter and stronger rods are available on the market.

Some prior fishing rods well known to those skilled in the art have been disclosed in Japanese Patent Laid-open No. 143582/78 and Japanese Utility Model Laid-open No. 54355/86 publications.

The fishing rod disclosed in the former publication is formed from prepreg sheets produced a described above and the prepreg sheet is curved into a tube. The impregnating resin used to produce the prepreg sheets contains microballoons, for example, silica balloons (or microglobules) of 50 to 100 μm in an amount of 20 to 30 wt %.

That rod tube contains less impregnating resin by 20 to 30 wt % because microballoons of a low specific gravity are dispersed in the resin. This results in a lighter rod tube.

Another fishing rod disclosed in the latter publication has a rod tube formed from thermosetting synthetic resin-impregnated high strength fiber. The rod tube is filled with foamed synthetic resin to increase both deflection and compressive strengths thereof.

To impregnate the woven sheets made from the high strength fiber with the thermosetting resin to produce the former prior rod, the sheets were passed through a resin layer containing microballoons into prepreg sheets. Thus the microballoons could not be uniformly dispersed in the impregnating resin layer with some part of the microballoons locally built up. That local buildup degraded the binding effect which the resin had on the microballoons, so that the produced rod was weakened and made easy to break. In addition to those influences, the rod condition (flexibility) was adversely affected.

The latter prior rod was filled with the foamed resin (resin having air or other gas dispersed there through) and the foam density was not uniform through the resin. Thus a desired strength could not be obtained from the produced rods and the products widely varied in strength. In addition, the rod tube had a taper form with the diameter gradually decreased from the butt to the tip. In a rod with a small diameter, uniform dispersion and expansion ratio control of the foaming agent were next to impossible. Some part of the rod tube could not be filled with the foamed resin and the adhesion between the rod's inner wall and the resin was so poor that the resin exfoliated from the rod in service to reduce the rod strength.

SUMMARY OF THE INVENTION

It is, therefore, an object of the present invention to provide a fishing rod having made of a light and high-strength rod tube as well as being of such structure as to be controllable to satisfy the weight, strength and condition (flexibility) requirements for each tip, butt or central portion of the rod.

It is another object of the present invention to provide a fishing rod having a light and high-strength rod tube which is not broken (crushed) by large deflection as well as to provide stable and high-strength fishing rod products with less dispersion in strength.

DESCRIPTION OF THE PREFERRED EMBODIMENT OF THE INVENTION

Now some embodiments of the present invention will be described below in detail referring to the attached drawings.

Figure 1:
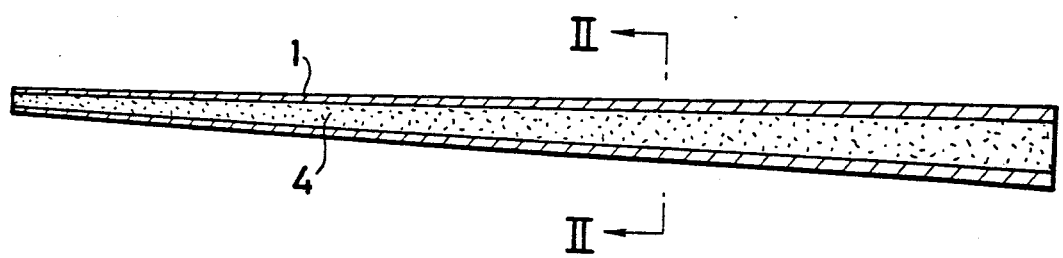
FIG. 1 is a longitudinal sectional view for showing the whole fishing rod according to the present invention.
Figure 2:
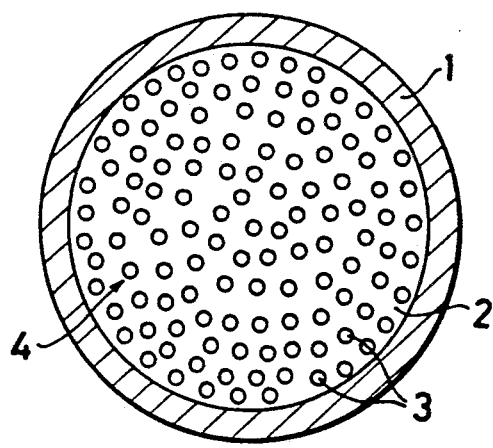
FIG. 2 is an enlarged sectional view taken on line II—II of FIG. 1.

FIG. 1 and FIG. 2 show an embodiment of the fishing rod according to the present invention. FIG. 1 is a longitudinal sectional view of the whole fishing rod and FIG. 2 is an enlarged sectional view taken on line II—II of FIG. 1

In those figures, the rod tube 1 forming a fishing rod is made from woven sheets of high strength fiber such as glass or carbon like the prior rods. The woven sheets are impregnated with epoxy, phenolic, or any other synthetic resin to produce prepreg sheets, which are curved into a tapered tube with the diameter decreased from the butt to the tip. This tapered tube is subjected to thermosetting into the rod tube 1. The rod tube 1 is then filled with a filler 4 which is obtained by uniformly dispersing micro-balloons 3 microglobules, for example, glass of 50 to 200 μm, in a thermosetting synthetic resin 2 such as epoxy or polyester resin at a volume ratio of 15 to 30%. Finally, the rod tube is subjected to another thermosetting to be integral with the filler.

Thus produced fishing rod has the rod tube 1 filled with the thermosetting synthetic resin core 2 in which the micro-balloons 3 are dispersed, making the production of a lighter fishing rod possible. The thermosetting synthetic resin 2 and the microballoons 3 can be injected in a mixture state to fill the rod tube 1. In the filled resin, therefore, the microballoons can be uniformly dispersed. In addition, the microballoons (in particular, glass bubbles) offer excellent wettability and adhesion to the resin, and if the filled resin is the same as for the rod tube 1, adhesion between the tube's inner wall and the filler can be much more improved to provide a high-strength fishing rod which withstands extreme bending.

Figure 3:
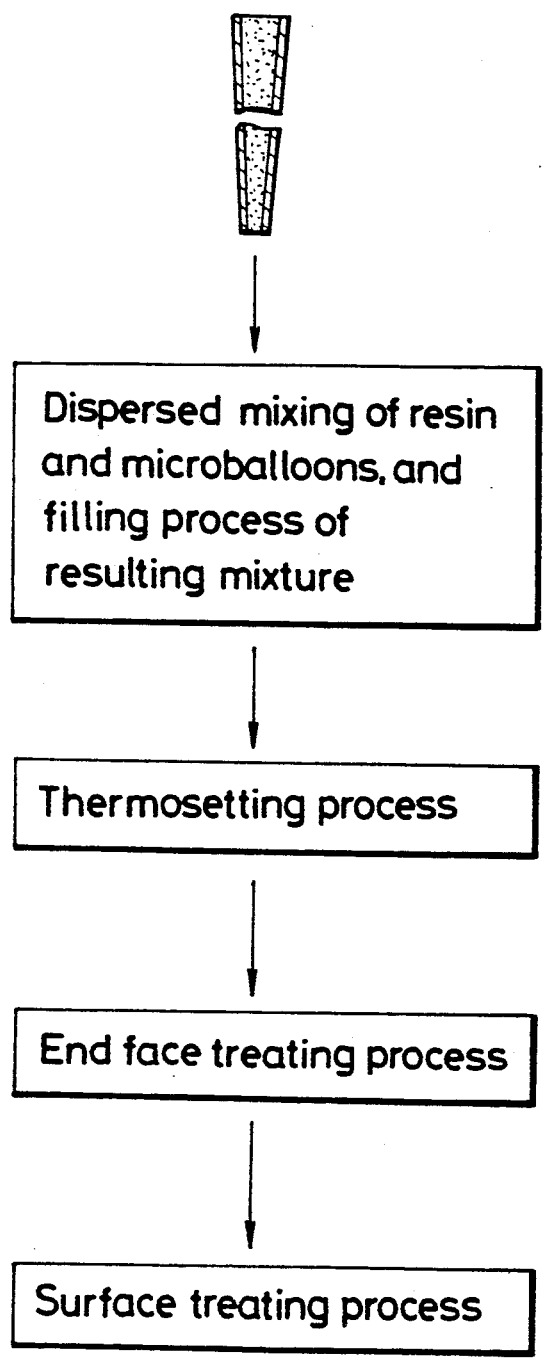
FIG. 3 is a flow chart for showing the production process for the present fishing rod.

Referring to FIG. 3 an example of, a production method of the fishing rod according to the present invention will be described below.

First, the rod tube 1 formed similarly to the prior rods is supported in a vertical position with the butt of a larger diameter upward or vice versa. Next, the microballoons 3 are dispersed in the thermosetting resin 2 such as epoxy resin at a ratio of 15 to 30% with respect to the resin. A curing agent is mixed with the mixture obtained above at a weight ratio of 65% and thus produced filler is injected into the rod tube 1 through its butt opening with an injector. If, during the injection, the rod tube 1 is subjected to vacuum suction with the tip opening connected to a suction means, uniform injection of the filler 4 can be assured over the full length of the rod tube 1. In addition, if any parting agent built up on the inner wall of the tube 1 is removed before the injection, adhesion between the filler 4 and the inner wall can be greatly increased.

After the filler 4 has been injected into the rod tube 1, it is hardened through a thermosetting process.

To meet the weight, strength, and condition requirements for each portion of the fishing rod, during the thermosetting process the position of the rod tube 1 is changed to a reverse position (in this example, to tip upward) or a horizontal (or inclined) position to control the distribution of the microballoons 3 in the filled resin as desired.

More specifically, if the thermosetting temperature and time are controlled while supporting the rod tube in a vertical position with the rod tip downward, as previously described, the micro-balloons 3 floating in the dissolved resin move upward toward the butt of the rod tube 1 due to buoyancy. This movement reduces the amount ( and thus the density) of the dispersed microballoons 3 in the rod tip, and the resin content in the rod tip increases to afford the fishing rod great resistance to deflection, resulting in a tip-flexible fishing rod. At the same time, in the rod butt, the content of the dispersed microballoons 3 increases and the resin content decreases, resulting in a lighter and stronger fishing rod with more rigidity in the butt thereof.

Alternatively, when the rod tube 1 is supported in a vertical position with the butt downward and subjected to thermosetting, the content of the microballoons 3 in the rod tip increases and the condition of the rod tip becomes less flexible (more rigid), resulting in a more center- or trunk-flexible fishing rod because of an increase in micro-balloons in the center and butt end of the rod.

When the rod tube 1 is supported in a horizontal position and rotated during the thermosetting process, the microballoons 3 can be uniformly dispersed throughout the rod filler core 4. This can provide a fishing rod with stable strength (uniform strength throughout the rod).

The production method described above allows the content of the dispersed microballoons to be controlled in the rod tip and butt. The weight, strength, and condition requirements also can be met at each portion of the fishing rod.

The thermoset rod tube as described above is then passed to additional processes such as end face treatment, painting, and other surface treatment.

From the foregoing, according to the present method, the weight, strength, and condition for each portion of the fishing rod can be adjusted as required. Unlike the prior method through which the rod tube is filled with foamed resin, the present method can provide fishing rod products with stable strength and decrease the strength variation between the products.

It should be appreciated that the resin filled in the rod tube according to the present invention is not limited to the thermosetting resin and various types of cold-setting resins may be used. Also a certain type of microballoons which are expanded by heat may be used for the above rod.

What is claimed is:

1. A method for producing a fishing rod, said method comprising filling a rod tube formed from high-strength fiber impregnated-thermosetting synthetic resin with thermosetting synthetic resin in which a predetermined amount of microglobules are dispersed, supporting the rod tube in a vertical position and subjecting the filled rod tube to thermosetting in such manner that during a thermosetting process the buoyant microglobules floating in the filled resin are permitted to move toward an upper end of the rod so as to provide the fishing rod so formed with a flexible upper end and a rigid lower end.

2. A method for producing a fishing rod according to claim 1, and further comprising connecting the lower end opening of the rod tube to a suction means for vacuum-suction, to thereby cause the microglobules in the thermosetting synthetic resin core to be dispersed along a length thereof.

3. A method for producing a fishing rod according to claim 1, wherein the thermosetting synthetic resin of the rod tube is the same as the synthetic resin used for adding microglobules and forming the core of the fishing rod.

4. A method for producing a fishing rod comprising filling a rod tube formed from thermosetting synthetic resin impregnated with high-strength fiber with thermosetting synthetic resin in which a predetermined amount of microglobules are dispersed, supporting the rod tube in a horizontal position and subjecting the filled rod tube to thermosetting in such manner that during a thermosetting process the buoyant microglobules floating in the filled resin become distributed throughout the rod core and further comprising rotating the fishing rod during the thermosetting of the core so as to permit the microglobules to be uniformly dispersed throughout the filled resin core.

* * * * *